(12) United States Patent
Doi

(10) Patent No.: US 12,533,976 B2
(45) Date of Patent: Jan. 27, 2026

(54) CHARGING DEVICE

(71) Applicant: TOYOTA JIDOSHA KABUSHIKI KAISHA, Toyota (JP)

(72) Inventor: Taiga Doi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/896,925

(22) Filed: Sep. 26, 2024

(65) Prior Publication Data
US 2025/0196678 A1    Jun. 19, 2025

(30) Foreign Application Priority Data

Dec. 18, 2023    (JP) ................... 2023-213241

(51) Int. Cl.
*B60L 53/22*        (2019.01)
*B60L 53/302*       (2019.01)
*B60R 16/033*       (2006.01)

(52) U.S. Cl.
CPC ............ *B60L 53/22* (2019.02); *B60L 53/302* (2019.02); *B60R 16/033* (2013.01); *B60L 2210/12* (2013.01); *B60L 2210/30* (2013.01); *B60L 2210/40* (2013.01)

(58) Field of Classification Search
CPC .... B60L 53/22; B60L 53/302; B60L 2210/12; B60L 2210/30; B60L 2210/40; B60L 53/11; B60L 53/14; B60L 53/20; B60R 16/033; Y02T 10/70; Y02T 10/7072; Y02T 90/14

USPC ............. 320/104, 109, 136, 138; 180/65.28; 307/9.1, 10.1
See application file for complete search history.

(56) References Cited

U.S. PATENT DOCUMENTS

| | | | |
|---|---|---|---|
| 2014/0319909 A1* | 10/2014 | Suzuki ................... | B60L 50/66 307/10.1 |
| 2023/0104002 A1 | 4/2023 | Azuma et al. | |
| 2023/0336087 A1* | 10/2023 | Kitazawa ............... | B60L 58/00 |
| 2025/0040108 A1* | 1/2025 | Apelsmeier ........... | H05K 7/209 |

FOREIGN PATENT DOCUMENTS

JP     2023-053656 A     4/2023

* cited by examiner

*Primary Examiner* — Elim Ortiz
(74) *Attorney, Agent, or Firm* — SoraIP, Inc.

(57) ABSTRACT

The charging device mounted on electrified vehicle includes: a first charger capable of converting AC power supplied from the outside to DC power supplied to the battery; a second charger capable of converting AC power supplied from the outside to DC power supplied to the battery, and capable of converting DC power supplied from the battery to AC power supplied to the outside; a DC-to-DC converter capable of converting DC power supplied from the battery to low-voltage DC power supplied to the auxiliary battery; a relay for electrically connecting and disconnecting the DC charging inlet to the battery; and a housing including a first chamber for accommodating the second charger, a second chamber for accommodating the first charger and the relay, and a third chamber for accommodating DC-to-DC converter.

1 Claim, 4 Drawing Sheets

| MODE | FIRST CHARGER | SECOND CHARGER | DC-TO-DC CONVERTERS | RELAY |
|---|---|---|---|---|
| AC CHARGE MODE | OPERATE | OPERATE | OPERATE | NOT OPERATE |
| DC CHARGE MODE | NOT OPERATE | NOT OPERATE | OPERATE | OPERATE |
| DC CHARGE MODE (MY ROOM) | NOT OPERATE | OPERATE | OPERATE | OPERATE |
| DRIVE MODE | NOT OPERATE | OPERATE | OPERATE | NOT OPERATE |

CHARGING DEVICE

CROSS-REFERENCE TO RELATED APPLICATION

This application claims priority to Japanese Patent Application No. 2023-213241 filed on Dec. 18, 2023, incorporated herein by reference in its entirety.

BACKGROUND

1. Technical Field

The present disclosure relates to charging devices, and more particularly, to a charging device that is mounted on an electrified vehicle.

2. Description of Related Art

Japanese Unexamined Patent Application Publication No. 2023-053656 (JP 2023-053656 A) describes a power control device that is mounted on an electrified vehicle. A plurality of circuits and devices such as a boost converter, an inverter, and a direct current-to-direct current (DC-to-DC) converter is integrated in this power control device.

SUMMARY

Charging devices formed by integrating a plurality of circuits and elements related to charging have been under development as power control units that are mounted on electrified vehicles. Circuits and devices related to charging generate a relatively large amount of heat when in operation. Therefore, if a plurality of circuits and devices related to charging is merely integrated by considering only reduction in size of a charging device, thermal interference may occur between the circuits or devices.

In view of the above circumstances, the present specification provides a technique for avoiding or reducing thermal interference between components disposed in a charging device while achieving reduction in size of the charging device.

The technique disclosed in the present specification is embodied in a charging device that is mounted on an electrified vehicle. According to a first aspect, the charging device includes:
a first charger configured to convert alternating current power supplied from outside to direct current power to be supplied to a battery of the electrified vehicle;
a second charger configured to convert the alternating current power supplied from the outside to the direct current power to be supplied to the battery, and configured to convert direct current power supplied from the battery to alternating current power to be supplied to the outside;
a DC-to-DC converter configured to convert the direct current power supplied from the battery to low voltage direct current power to be supplied to an auxiliary battery of the electrified vehicle;
a relay configured to electrically connect and disconnect a direct current charging inlet of the electrified vehicle to and from the battery; and
a housing including a first chamber that houses the second charger, a second chamber that houses the first charger and the relay, and a third chamber that houses the DC-to-DC converter.

In the above charging device, the first charger and the relay are typically not expected to operate at the same time. Therefore, the first charger and the relay are disposed in the same second chamber of the housing. On the other hand, each of the second charger and the DC-to-DC converter is expected to operate simultaneously with other components. The second charger and the DC-to-DC converter are therefore separately disposed in the first and third chambers of the housings, respectively. With this configuration, it is possible to avoid or reduce thermal interference between the components disposed in the charging device while achieving reduction in size of the charging device.

According to a second aspect, in the first aspect, a first cooling medium channel configured to cool the second charger and a second cooling medium channel configured to cool the DC-to-DC converter may be provided in the housing. With such a configuration, the second charger and the DC-to-DC converter that frequently generate heat can be efficiently cooled by the cooling medium channels that are independent of each other.

According to a third aspect, in the second aspect, the first charger and the relay may be cooled by a common cooling medium channel provided in the housing. In this case, the common cooling medium channel may be, but is not particularly limited to, the first cooling medium channel or the second cooling medium channel. Since the first charger and the relay do not operate at the same time, cooling the first charger and the relay by the common cooling medium channel can simplify cooling paths provided in the housing.

According to a fourth aspect, in the third aspect, the first chamber may be located above the second chamber, and the second chamber may be located above the third chamber. In this case, the second charger may be attached to an upper surface of the first chamber, and the first cooling medium channel may be provided in an upper wall of the housing that forms the upper surface of the first chamber. The first charger and the relay may be attached to a lower surface of the second chamber, and the DC-to-DC converter may be attached to an upper surface of the third chamber. The second cooling medium channel may be provided in a partition wall of the housing that forms the lower surface of the second chamber and the upper surface of the third chamber. With such a configuration, the components can be efficiently cooled by the cooling medium channels having a relatively simple structure while reducing thermal interference between the components.

According to a fifth aspect, in any one of the first to fourth aspects, the charging device may further include a control device configured to control operation of the first charger and the second charger when charging the battery with the alternating current power supplied from the outside. In this case, the control device may be configured to operate only the first charger when charge command power to the battery is lower than maximum output of the first charger, and may be configured to operate the first charger and the second charger when the charge command power is greater than the maximum output of the first charger.

As described above, the first charger is operated only when charging the battery with an external alternating current power supply, whereas the second charger is operated not only when charging the battery with the external alternating current power supply, but also when supplying electric power to the outside. Therefore, in the case where the charge command power is relatively small when charging the battery with the external alternating current power supply, the first charger is preferentially operated. Cumulative usage time can thus be equalized between the first charger and the second charger. This can reduce the thermal load on the second charger, and can increase the service life of the charging device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
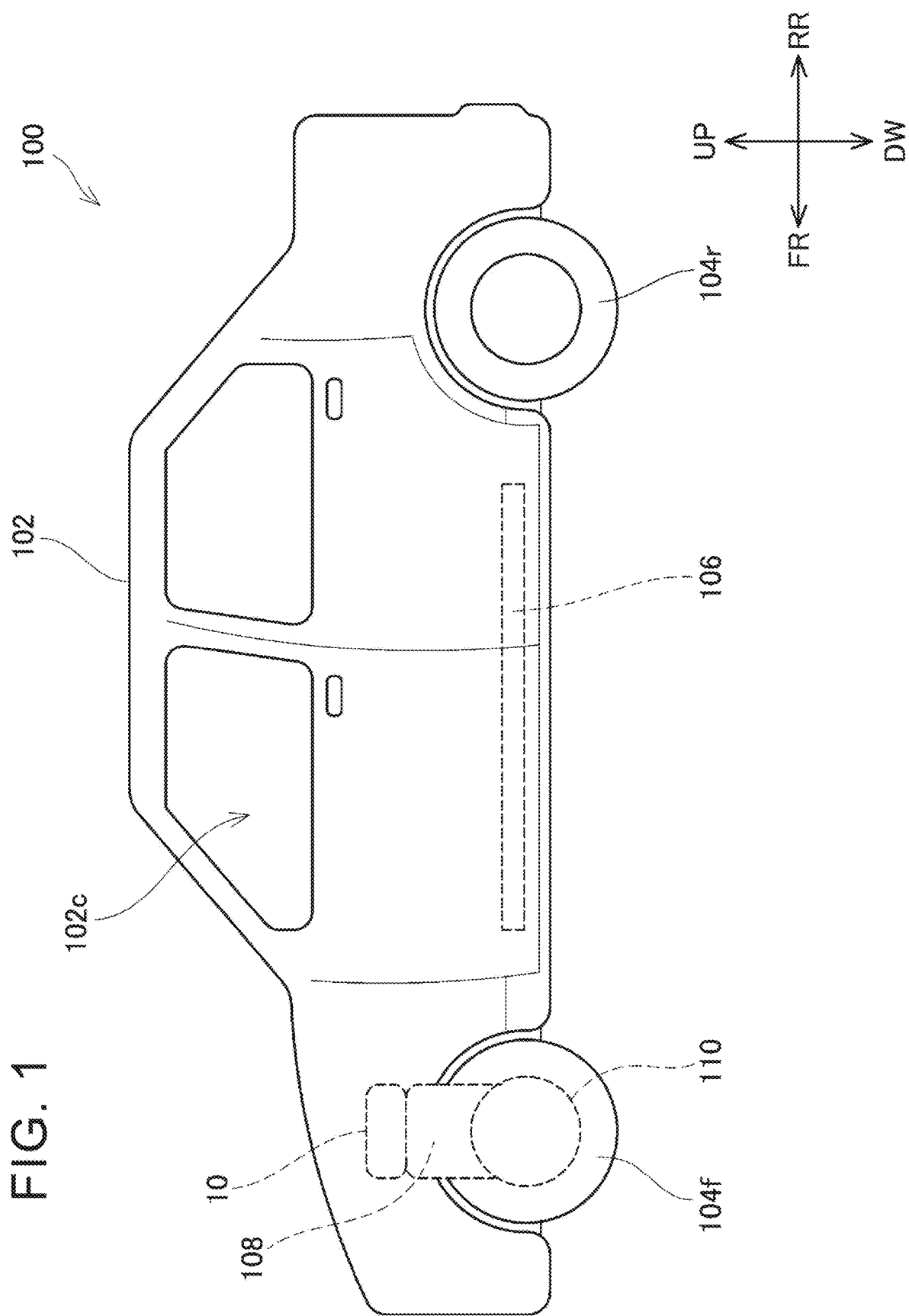
FIG. 1 is a diagram schematically showing a configuration of a vehicle 100 on which a charging device 10 is mounted.

The charging device 10 of the embodiment and the vehicle 100 on which the charging device is mounted will be described with reference to the drawings. Here, the vehicles 100 are electrified vehicle having a motor 110 that drives a wheel 104f, 104r. Vehicle 100 in this embodiment is a rechargeable battery electric vehicle that is charged by an external power supply. However, the vehicles 100 may be hybrid electric vehicle (i.e., plug-in hybrid electric vehicle) charged by an external power supply.

Here, the direction FR illustrated in the drawings indicates the front in the front-rear direction of the vehicle 100, and the direction RR indicates the rear in the front-rear direction of the vehicle 100. The direction UP indicates an upward direction in the up-down direction of the vehicle 100, and the direction DW indicates a downward direction in the up-down direction of the vehicle 100. In this specification, the front-rear direction of the vehicle 100, the left-right direction of the vehicle 100, and the up-down direction of the vehicle 100 may be simply referred to as the front-rear direction, the left-right direction, and the up-down direction, respectively.

As illustrated in FIG. 1, a vehicle 100 includes a vehicle body 102 and a plurality of wheel 104f, 104r. The vehicle body 102 has a vehicle cabin 102c that is a space in which an occupant (for example, a user of the vehicle 100) is placed. The plurality of wheel 104f, 104r are rotatably attached to the vehicle body 102. The plurality of wheel 104f, 104r includes a pair of front wheel 104f located at the front portion of the vehicle body 102 and a pair of rear wheel 104r located at the rear portion of the vehicle body 102. The pair of front wheel 104f are disposed coaxially with each other, and the pair of rear wheel 104r are also disposed coaxially with each other. The number of wheel 104f, 104r is not limited to four. Although not particularly limited, the vehicle body 102 is made of a metal such as a steel material or an aluminum alloy.

Figure 2:
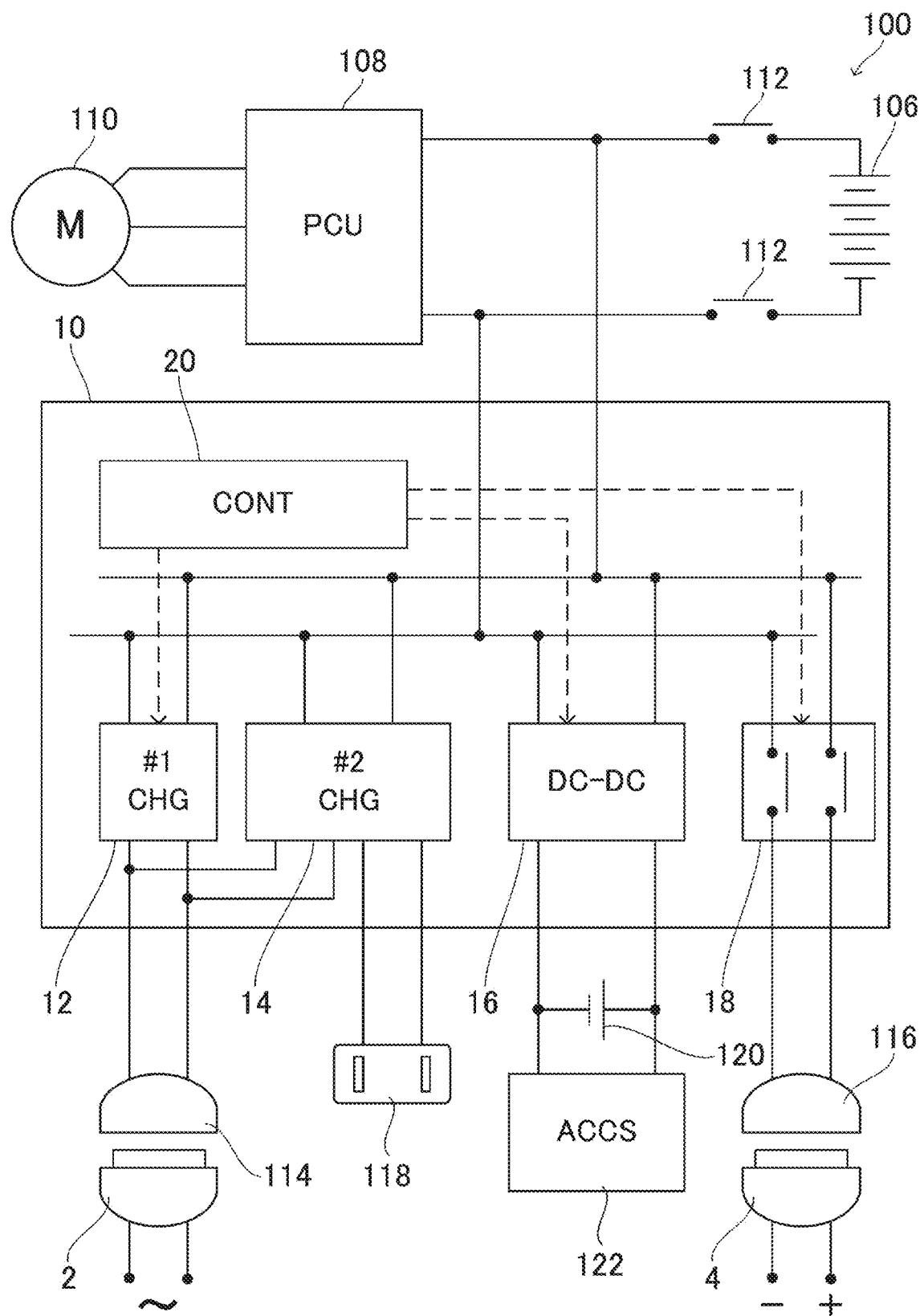
FIG. 2 is a block circuit diagram illustrating an electrical configuration of the charging device 10 according to the embodiment.

As illustrated in FIGS. 1 and 2, the vehicle 100 further includes a main battery 106, a power control unit (Power Control Unit: PCU) 108, a motor 110, and a system main relay 112. The main battery 106 includes a plurality of secondary battery cells such as lithium ion battery cells, nickel-metal hydride battery cells, or all-solid-state battery cells. The main battery 106 is a high-voltage battery whose output voltage is higher than 100 volts.

PCU 108 includes inverters, converters, and the like. PCU 108 controls the power supplied between the main battery 106 and the motor 110. The motor 110 is a traveling motor that drives a pair of front wheel 104f, and is connected to a pair of front wheel 104f. The motor 110 is electrically connected to the main battery 106 via a PCU 108. For example, when the vehicle 100 accelerates, PCU 108 controls the drive power supplied from the main battery 106 to the motor 110. Alternatively, when the vehicle 100 decelerates, PCU 108 controls the regenerative power supplied from the motor 110 to the main battery 106. The motor 110 is not limited to a pair of front wheel 104f, and may be configured to drive at least one of a plurality of wheel 104f, 104r.

The system main relay 112 is electrically interposed between the main battery 106 and the motor 110. Therefore, when the system main relay 112 is closed and opened, the main battery 106 and the motor 110 are electrically connected and disconnected from each other. The operation of the system main relay 112 may be controlled by the control device 20 of the charging device 10, or may be controlled by another control device (not shown).

As illustrated in FIGS. 1 and 2, the vehicle 100 further includes a charging device 10, an AC charging inlet 114, a DC charging inlet 116, and a power supply outlet 118. The AC charging inlet 114, the DC charging inlet 116, and the power supply outlet 118 are electrically connected to the main battery 106 via the charging device 10.

The AC charging inlet 114 is configured such that an external AC power supply 2 can be attached and detached. The external AC power supply 2 is, for example, a commercial power supply for home use. The AC charging inlet 114 receives charging power for charging the main battery 106 from the external AC power supply 2. The AC charging inlet 114 of the present embodiment is connected to an external AC power supply 2 via a cable. However, as another embodiment, the AC charging inlet 114 may be wirelessly connected to the external AC power supply 2.

The DC charging inlet 116 is configured such that an external DC power supply 4 can be attached and detached. The external DC power supply 4 is, for example, a charging station. The DC charging inlet 116 receives charging power for charging the main battery 106 from an external DC power supply 4. The DC charging inlet 116 of the present embodiment is connected to an external DC power supply 4 via a cable. However, as another embodiment, the DC charging inlet 116 may be wirelessly connected to the external DC power supply 4.

The power supply outlet 118 is disposed in the vehicle cabin 102c. The power supply outlet 118 is configured to be detachable from an electric apparatus. The power supply outlet 118 outputs alternating current power to an electric apparatus. Examples of the electric device include a home electric appliance, a personal computer, a smartphone, and a tablet terminal.

As illustrated in FIG. 2, the vehicle 100 further includes an auxiliary battery 120 and at least one auxiliary device 122. The auxiliary battery 120 is a low-voltage battery having a rated voltage of 30 volts or less. The auxiliary battery 120 supplies power to at least one auxiliary machine 122. The at least one auxiliary device 122 includes, for example, an electric control unit, lights, audio equipment, a car navigation system, a drive recorder, and the like.

Figures 3, 4:
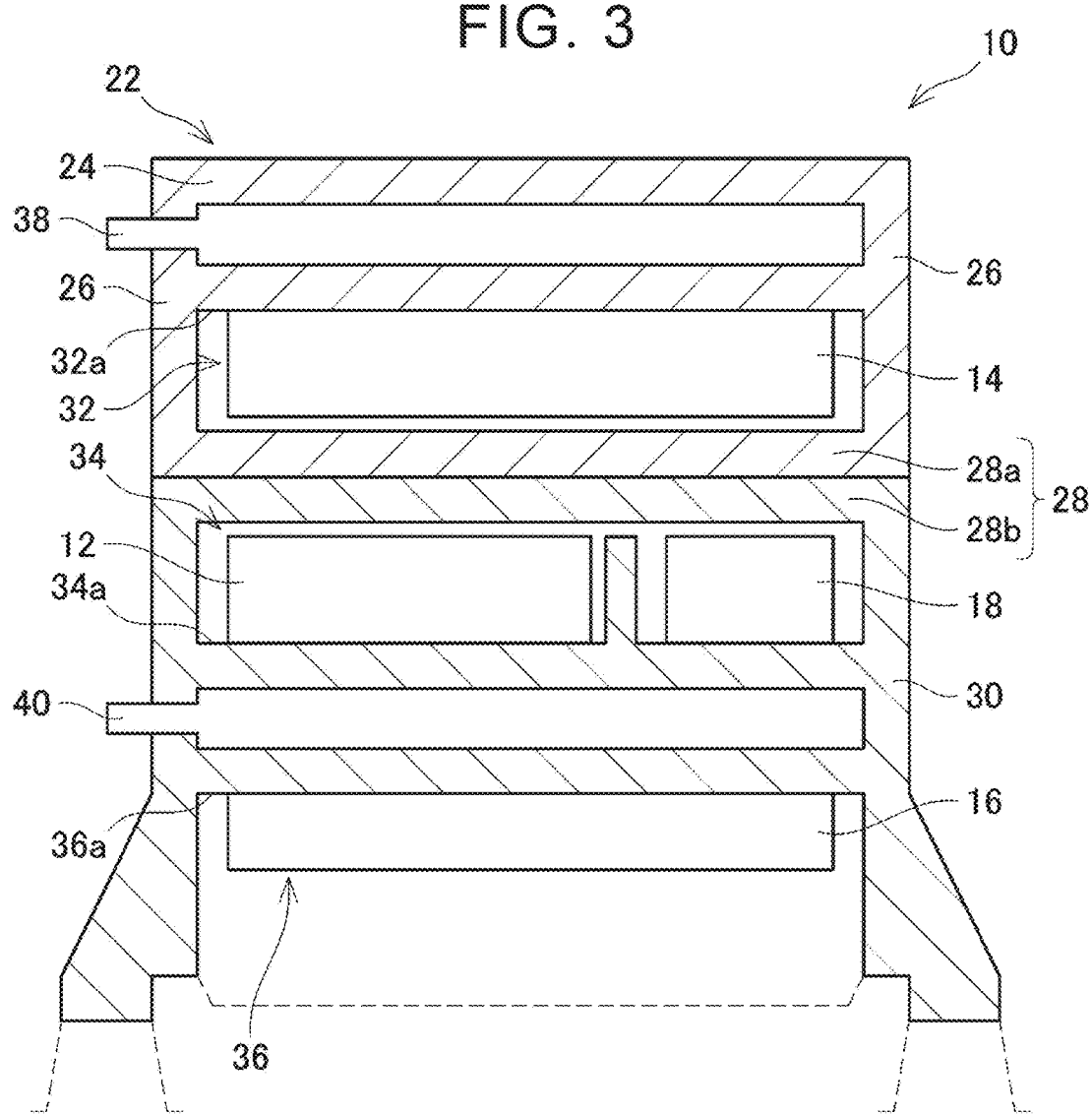
FIG. 3 is a diagram schematically showing a mechanical configuration of the charging device 10 according to the embodiment; it should be noted that, for reference, a separate device disposed below the charging device 10 is indicated by a broken line.
FIG. 4 is a diagram showing the operation status of each component in each mode.

Next, an electrical configuration of the charging device 10 will be described. As illustrated in FIGS. 2 and 3, the charging device 10 includes a first charger 12. The first charger 12 is a type of power converter. The first charger 12 is electrically connected to the AC charging inlet 114, and is electrically interposed between the AC charging inlet 114 and the main battery 106. The first charger 12 can convert AC power supplied from the external AC power supply 2 to DC power supplied to the main battery 106. Thus, the first charger 12 can charge the main battery 106 using the AC power supplied from the outside.

As illustrated in FIGS. 2 and 3, the charging device 10 further includes a second charger 14. The second charger 14 is a type of power converter. The second charger 14 is electrically connected to the AC charging inlet 114, and is electrically interposed between the AC charging inlet 114 and the main battery 106. The second charger 14 can convert AC power supplied from the external AC power supply 2 to DC power supplied to the main battery 106. Accordingly, the second charger 14 can charge the main battery 106 using the AC power supplied from the outside.

In addition, the second charger 14 is also electrically connected to the power supply outlet 118, and is electrically interposed between the power supply outlet 118 and the main battery 106. The second charger 14 can convert the DC power supplied from the main battery 106 to the AC power supplied to the power supply outlet 118. Accordingly, the second charger 14 can convert the DC power supplied from the main battery 106 to AC power and supply the AC power to the outside of the vehicle 100, that is, to the electric apparatus connected to the power supply outlet 118. That is, the second charger 14 is a charger having not only a charging function but also a power supply function, and is also referred to as a bidirectional charger.

The charging device 10 is electrically connected to the main battery 106 not only when charging the vehicle 100 but also when the vehicle 100 is traveling. Accordingly, the second charger 14 can supply the electric power from the main battery 106 to the power supply outlet 118 even while the vehicle 100 is running.

As illustrated in FIGS. 2 and 3, the charging device 10 further includes DC-to-DC converters 16. DC-to-DC converters 16 are a kind of power converters. DC-to-DC converters 16 are electrically connected to the auxiliary battery 120, and are electrically interposed between the main battery 106 and the auxiliary battery 120. DC-to-DC converters 16 can step down the DC power supplied from the main battery 106 and supply the DC power to the auxiliary battery 120. Thus, DC-to-DC converter 16 can charge the auxiliary battery 120 with the high-voltage DC power supplied from the main battery 106.

As illustrated in FIGS. 2 and 3, the charging device 10 further includes a relay 18. The relay 18 is electrically connected to the DC charging inlet 116, and is electrically interposed between the DC charging inlet 116 and the main battery 106. When the relay 18 is closed, the DC charging inlet 116 is electrically connected to the main battery 106. Thus, the main battery 106 is charged with DC power supplied from the outside.

As illustrated in FIGS. 2 and 3, the charging device 10 further includes a control device 20. The control device 20 is communicably connected to each of the first charger 12, the second charger 14, DC-to-DC converters 16, and the relays 18, and controls these operations. For example, when the external AC power supply 2 is connected to the AC charging inlet 114, the control device 20 gives an operation command to the first charger 12 and/or the second charger 14. Accordingly, the charging device 10 charges the main battery 106. Alternatively, when an external DC power supply 4 is connected to the DC charging inlet 116, the control device 20 closes the relay 18 and electrically connects the DC charging inlet 116 to the main battery 106. Accordingly, the charging device 10 charges the main battery 106. Since the relay 18 is maintained in an open state except for charging by the external DC power supply 4, the DC charging inlet 116 is electrically disconnected from the main battery 106.

A mechanical configuration of the charging device 10 will be described with reference to FIG. 3. As shown in FIG. 3, the charging device 10 further includes a housing 22. The housing 22 is a housing member. The housing 22 has an upper wall 24 and four side walls 26 extending downwardly from an outer peripheral edge of the upper wall 24. The housing 22 is made of a metal such as an aluminum-based metal. As will be described in detail later, since the first chamber 32, the second chamber 34, and the third chamber 36 are arranged in this order from the upper side to the lower side of the housing 22, the upper wall 24 of the housing 22 forms the upper surface 32a of the first chamber 32.

The housing 22 further includes a first partition wall 28 and a second partition wall 30. The first partition wall 28 and the second partition wall 30 are provided inside the housing 22. The second partition wall 30 is located below the first partition wall 28. The first partition wall 28 and the second partition wall 30 divide the internal space of the housing 22 into a first chamber 32, a second chamber 34, and a third chamber 36. Specifically, the first chamber 32 is positioned above the second chamber 34 with the first partition wall 28 interposed therebetween. The second chamber 34 is positioned above the third chamber 36 with the second partition wall 30 therebetween. The second partition wall 30 of the housing 22 forms the lower surface 34a of the second chamber 34 and the upper surface 36a of the third chamber 36.

The first partition wall 28 includes a plate-shaped member 28a that forms the lower surface of the first chamber 32 and a plate-shaped member 28b that forms the upper surface of the second chamber 34. Therefore, the housing 22 of the present embodiment can be formed by integrating the upper portion of the housing 22 and the lower portion of the housing 22.

As shown in FIG. 3, the second charger 14 is housed in the first chamber 32. Specifically, the second charger 14 is attached to the upper surface 32a of the first chamber 32. The first charger 12 and the relay 18 are accommodated in the second chamber 34. Specifically, the first charger 12 and the relays 18 are attached to the lower surface 34a of the second chamber 34. DC-to-DC converters 16 are housed in the third chamber 36. Specifically, DC-to-DC converters 16 are attached to the upper surface 36a of the third chamber 36.

As shown in FIG. 3, the housing 22 is provided with a first cooling medium channel 38 and a second cooling medium channel 40. The first cooling medium channel 38 and the second cooling medium channel 40 are channels through which a cooling medium such as coolant flows. In the present embodiment, the first cooling medium channel 38 is provided inside the upper wall 24 of the housing 22. As described above, the upper wall 24 forms the upper surface 32a of the first chamber 32, and the second charger 14 is attached to the upper surface 32a of the first chamber 32. Thus, the first cooling medium channel 38 is configured to cool the second charger 14.

In the present embodiment, the second cooling medium channel 40 is provided in the second partition wall 30 of the housing 22. As described above, the second partition wall 30 forms the lower surface 34a of the second chamber 34, and the first charger 12 and the relays 18 are attached to the lower surface 34a of the second chamber 34. The second partition wall 30 also forms an upper surface 36a of the third chamber 36, and DC-to-DC converters 16 are attached to the upper surface 36a of the third chamber 36. Thus, the second cooling medium channel 40 is configured to cool both the first charger 12 and the relay 18 disposed in the second chamber 34 and DC-to-DC converters 16 disposed in the third chamber 36.

In the charging device 10 of the present embodiment, as illustrated in FIG. 4, four operation modes are assumed: a AC charging mode, a DC charging mode, a DC charging mode (my room), and a traveling mode.

AC charge mode is an operation mode in which the main battery 106 is charged by AC power supplied from the outside. In this case, the first charger 12 and the second charger 14 operate. When the auxiliary battery 120 needs to be charged or the auxiliary device 122 needs to be operated, DC-to-DC converters 16 may also operate at the same time. On the other hand, it is not assumed that the relay 18 operates. That is, in AC charge mode, the first charger 12, the second charger 14, and DC-to-DC converters 16 may generate heat, while the relays 18 do not generate heat.

DC charge mode is an operation mode in which the main battery 106 is charged by the DC power supplied from the outside. In this case, the relay 18 operates. When the auxiliary battery 120 needs to be charged or the auxiliary device 122 needs to be operated, DC-to-DC converters 16 may also operate at the same time. On the other hand, it is not assumed that the first charger 12 and the second charger 14 operate. That is, in DC charge mode, DC-to-DC converters 16 and the relays 18 may generate heat, while the first charger 12 and the second charger 14 do not generate heat.

DC charge mode (My Room) is a mode in which the user of the vehicle 100 uses the vehicle cabin 102c of the vehicle 100 as the user's own room (My Room) during the above-described DC charge mode. For example, a user of the vehicle 100 can use an electric device brought from the outside by connecting the electric device to the power supply outlet 118. In this case, the second charger 14 and the relay 18 operate. When the auxiliary battery 120 needs to be charged or the auxiliary device 122 needs to be operated, DC-to-DC converters 16 may also operate at the same time. On the other hand, the first charger 12 does not operate. That is, in DC charge mode, the second charger 14, DC-to-DC converters 16, and the relays 18 may generate heat, while the first charger 12 does not generate heat.

The traveling mode is an operation mode when the vehicle 100 is traveling. Also in this mode, the user of the vehicle 100 may use the vehicle cabin 102c of the vehicle 100 as the user's own room (my room). In this case, the second charger 14 operates. When the auxiliary battery 120 needs to be charged or the auxiliary device 122 needs to be operated, DC-to-DC converters 16 may also operate at the same time. On the other hand, it is not assumed that the first charger 12 and the relay 18 operate. That is, in the running mode, the second charger 14 and DC-to-DC converters 16 may generate heat, while the first charger 12 and the relays 18 do not generate heat.

As described above, in the charging device 10 of the present embodiment, the first charger 12 and the relay 18 are typically not expected to operate simultaneously. Thus, the first charger 12 and the relay 18 are disposed in the same second chamber 34 of the housing 22. On the other hand, each of the second charger 14 and the DC-to-DC converters 16 is expected to operate simultaneously with other components. Accordingly, the second charger 14 and DC-to-DC converters 16 are disposed separately in the first chamber 32 and the third chamber 36 of the housing 22, respectively. Thus, while reducing the size of the charging device 10, it is possible to avoid or suppress the occurrence of thermal interference between components disposed therein.

The main battery 106 in the present embodiment is an example of a battery in the present disclosure. The second cooling medium channel 40 in the present embodiment is an example of a common cooling medium channel in the present disclosure. The second partition wall 30 in the present embodiment is an example of the partition wall of the housing in the present disclosure.

In the above embodiment, a first cooling medium channel 38 for cooling the second charger 14 and a second cooling medium channel 40 for cooling DC-to-DC converters 16 are provided. With such a configuration, the second charger 14 and the DC-to-DC converter 16 that frequently generate heat can be efficiently cooled by the cooling medium channels that are independent of each other.

In the above-described embodiment, the first charger 12 and the relay 18 are cooled by the second cooling medium channel 40 provided in the housing 22. However, as another embodiment, the first charger 12 and the relay 18 may be cooled by the first cooling medium channel 38 that cools the second charger 14. Alternatively, as yet another embodiment, a third cooling medium channel for cooling the first charger 12 and the relay 18 may be further provided. Since the first charger 12 and the relay 18 do not operate at the same time, cooling the first charger and the relay by the common cooling medium channel can simplify cooling paths provided in the housing 22.

In the embodiment described above, the first chamber 32 is located above the second chamber 34, and the second chamber 34 is located above the third chamber 36. The second charger 14 is attached to the upper surface 32a of the first chamber 32, and the first cooling medium channel 38 is provided inside the upper wall 22a of the housing 22 forming the upper surface 32a of the first chamber 32. The first charger 12 and the relays 18 are attached to the lower surface 34a of the second chamber 34, and DC-to-DC converters 16 are attached to the upper surface 36a of the third chamber 36. The second cooling medium channel 40 is provided in the second partition wall 30 of the housing 22 that forms the lower surface 34a of the second chamber 34 and the upper surface 36a of the third chamber 36. According to such a configuration, it is possible to effectively cool each of the components by the cooling medium channel having a relatively simple structure while suppressing thermal interference between the components.

Figure 5:
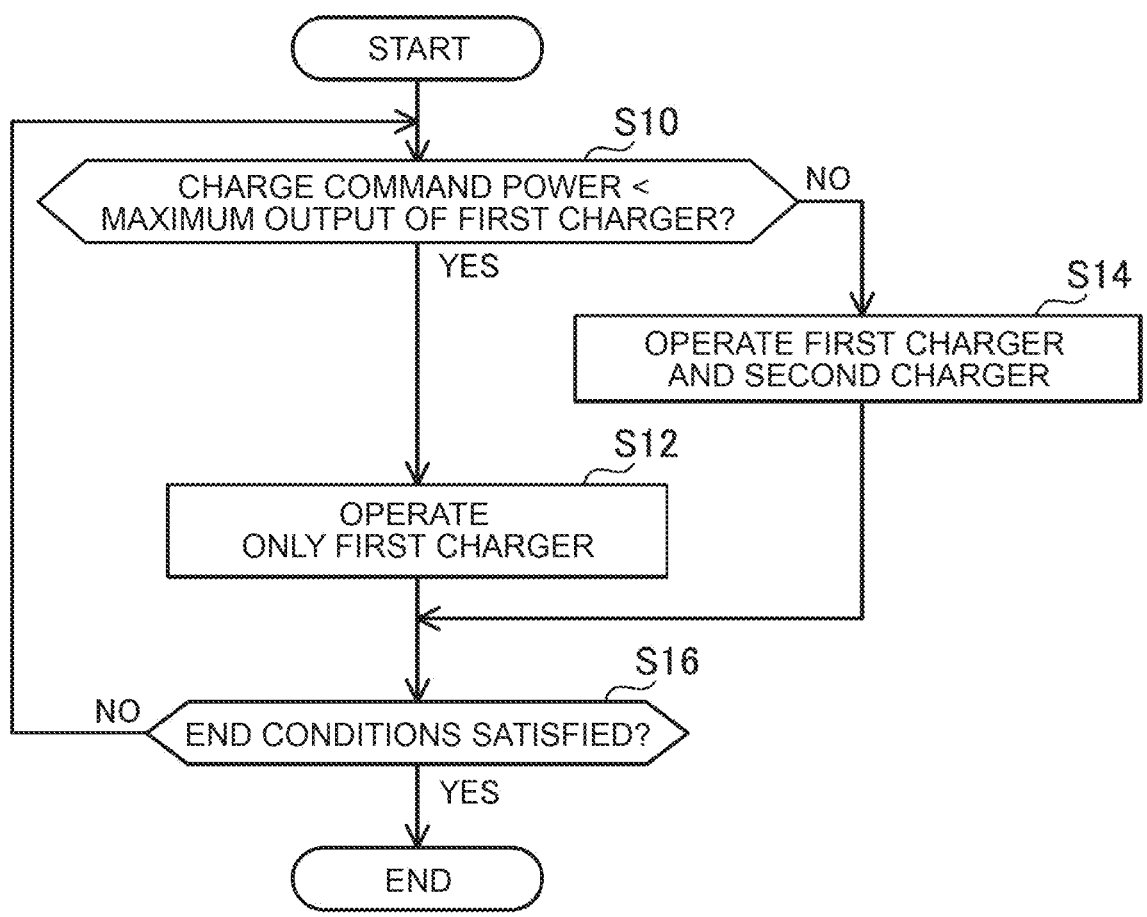
FIG. 5 is a flowchart for explaining a series of processes executed by the control device 20.

As an example, the control device 20 according to the present embodiment can execute a series of processes illustrated in FIG. 5. The control device 20 controls the operations of the first charger 12 and the second charger 14 to execute a series of processes illustrated in FIG. 5 when the main battery 106 is charged by the AC power supplied from the outside (that is, AC charge mode is being executed). For example, the control device 20 starts a series of processes by connecting an external AC power supply 2 to the AC charging inlet 114.

As illustrated in FIG. 5, the control device 20 first determines whether or not the charge command power for the main battery 106 is lower than the maximum power of the first charger 12 (S10). When S10 is YES, the control device 20 operates only the first charger 12 (S12). Thus, the first charger 12 charges the main battery 106 using the AC power supplied from the outside. On the other hand, when S10 is NO (i.e., when the charge command power is greater than maximum power of the first charger 12), the control device 20 operates the first charger 12 and the second charger 14 (S14). Thus, the first charger 12 and the second charger 14 charge the main battery 106 using AC power supplied from the outside.

Next, the control device 20 determines whether or not AC charge-mode termination condition is satisfied (S16). The termination condition includes, for example, that the external AC power supply 2 is removed from the AC charging inlet 114, and that the state of charge (SOC) of the main battery 106 is higher than a predetermined value. If S16 is NO, the control device 20 returns to S10 process. If S16 is YES, the control device 20 ends the series of processes. That is, the processes of S10 to S16 are repeated until it becomes YES in S16.

As described above, the first charger 12 operates only in AC charging mode of the main battery 106, whereas the second charger 14 operates not only in AC charging mode of the main battery 106 but also in the power supply to the outside. Therefore, in the case where the charge command power is relatively small in the AC charge mode of the main battery 106, the first charger 12 is preferentially operated. Cumulative usage time can thus be equalized between the first charger 12 and the second charger 14. This can reduce the thermal load on the second charger 14, and can increase the service life of the charging device 10.

Although a number of specific examples have been described in detail above, these are merely examples and do not limit the scope of claims. The techniques described in the claims include various modifications and alterations of the specific examples illustrated above. The technical elements described in the present specification or drawings exhibit technical utility either on its own or in combination.

What is claimed is:

1. A charging device that is mounted on an electrified vehicle, the charging device comprising:

a first charger configured to convert alternating current power supplied from outside to direct current power to be supplied to a battery of the electrified vehicle;

a second charger configured to convert the alternating current power supplied from the outside to the direct current power to be supplied to the battery, and configured to convert direct current power supplied from the battery to alternating current power to be supplied to the outside;

a direct current-to-direct current converter configured to convert the direct current power supplied from the battery to low voltage direct current power to be supplied to an auxiliary battery of the electrified vehicle;

a relay configured to electrically connect and disconnect a direct current charging inlet of the electrified vehicle to and from the battery; and a housing including a first chamber that houses the second charger, a second chamber that houses the first charger and the relay, and a third chamber that houses the direct current-to-direct current converter, wherein a first cooling medium channel configured to cool the second charger and a second cooling medium channel configured to cool the direct current-to-direct current converter are provided in the housing, the first charger and the relay are cooled by a common cooling medium channel provided in the housing, the first chamber is located above the second chamber, the second chamber is located above the third chamber, the second charger is attached to an upper surface of the first chamber, the first cooling medium channel is provided in an upper wall of the housing that forms the upper surface of the first chamber, the first charger and the relay are attached to a lower surface of the second chamber, the direct current-to-direct current converter is attached to an upper surface of the third chamber, and the second cooling medium channel is provided in a partition wall of the housing that forms the lower surface of the second chamber and the upper surface of the third chamber.

* * * * *